United States Patent
Wang et al.

(10) Patent No.: US 11,682,977 B2
(45) Date of Patent: Jun. 20, 2023

(54) CONTROLLER AND CONTROL SYSTEM FOR DC/DC CONVERTER

(71) Applicant: Huawei Digital Power Technologies Co., Ltd., Shenzhen (CN)

(72) Inventors: Lei Wang, Shenzhen (CN); Liang Wu, Dongguan (CN); Gun Yang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/668,991

(22) Filed: Feb. 10, 2022

(65) Prior Publication Data
US 2022/0255444 A1    Aug. 11, 2022

(30) Foreign Application Priority Data
Feb. 10, 2021   (CN) .......................... 202110184240.1

(51) Int. Cl.
*H02M 3/335*    (2006.01)
*H02M 1/00*     (2006.01)
*H02M 1/08*     (2006.01)

(52) U.S. Cl.
CPC ..... *H02M 3/33571* (2021.05); *H02M 1/0054* (2021.05); *H02M 1/08* (2013.01)

(58) Field of Classification Search
CPC .. H02M 3/33571; H02M 1/0054; H02M 1/08; H02M 1/0064; H02M 3/01
See application file for complete search history.

(56) References Cited

U.S. PATENT DOCUMENTS

| | | |
|---|---|---|
| 2015/0229219 A1 | 8/2015 | Choi |
| 2016/0111961 A1 | 4/2016 | Balakrishnan et al. |
| 2019/0115845 A1 | 4/2019 | Jitaru |
| 2020/0169180 A1 | 5/2020 | Jitaru |
| 2020/0195154 A1 | 6/2020 | Mayell et al. |
| 2022/0294358 A1* | 9/2022 | Wang ...................... H02M 3/01 |

FOREIGN PATENT DOCUMENTS

| | | |
|---|---|---|
| CN | 101047339 A | 10/2007 |
| CN | 104300795 A | 1/2015 |
| CN | 105375783 A | 3/2016 |

(Continued)

*Primary Examiner* — Kyle J Moody
(74) *Attorney, Agent, or Firm* — Gregg L. Jansen (57) ABSTRACT

This application provides a controller and control system for a DC/DC converter. The DC/DC converter includes a first switching transistor, a second switching transistor, a first capacitor, and a transformer. The transformer includes an excitation inductor and a transformer leakage inductor. The controller controls the first switching transistor to turn on to form a first closed circuit, where a current in the excitation inductor increases in a first direction; when a preset time period expires, the controller controls the first switching transistor to turn off, so that a voltage at two ends of the second switching transistor decreases; and when the voltage at the two ends of the second switching transistor is a first preset voltage threshold, the controller controls the second switching transistor to turn on to form a second closed circuit. When embodiments of this application are implemented, a turn-on loss in the DC/DC converter can be reduced.

20 Claims, 4 Drawing Sheets

(56) References Cited

FOREIGN PATENT DOCUMENTS

| | | | |
|---|---|---|---|
| CN | 106558999 | A | 4/2017 |
| CN | 106602880 | A | 4/2017 |
| CN | 109639149 | A | 4/2019 |
| CN | 110224612 | A | 9/2019 |
| CN | 110601540 | A | 12/2019 |
| CN | 111010036 | A | 4/2020 |
| CN | 113014104 | A | 6/2021 |
| CN | 113595400 | A | 11/2021 |
| EP | 3051679 | A1 | 8/2016 |
| EP | 3726716 | A1 | 10/2020 |
| WO | 2020055669 | A1 | 3/2020 |

* cited by examiner

CONTROLLER AND CONTROL SYSTEM FOR DC/DC CONVERTER

CROSS-REFERENCE TO RELATED APPLICATION

This application claims priority to Chinese Patent Application No. 202110184240.1, filed on Feb. 10, 2021, which is hereby incorporated by reference in its entirety.

TECHNICAL FIELD

This application relates to the field of power technologies, and in particular, to a controller and control system for a DC/DC converter.

BACKGROUND

Figure 1:
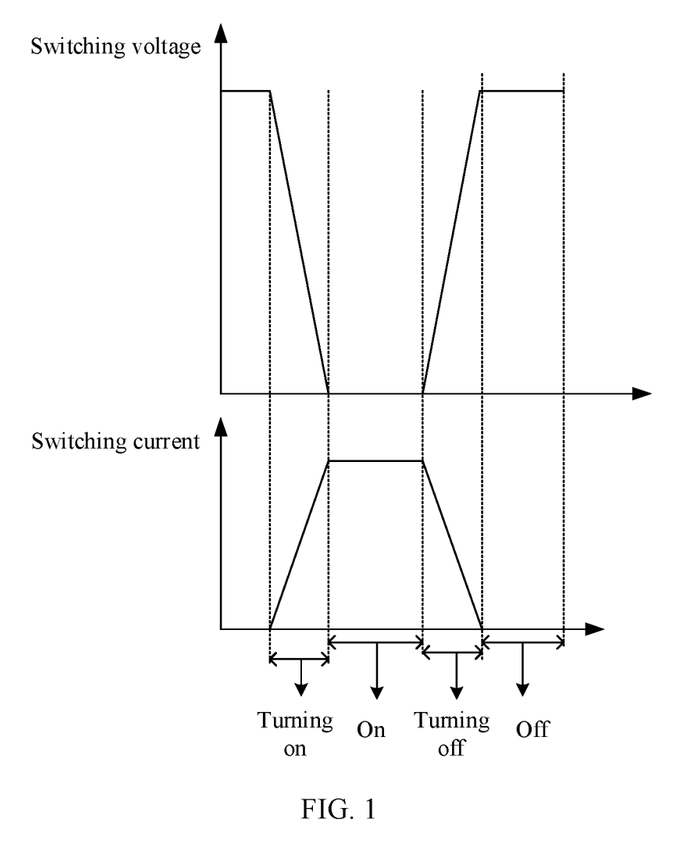
FIG. 1 is a schematic diagram of a voltage and a current existing in processes of a switching transistor turning on and off according to an embodiment of this application.

A DC/DC converter (Direct-Current/Direct-Current converter) includes a switching transistor, an inductor, a capacitor, and the like, and charges or discharges the inductor and the capacitor by controlling the switching transistor to turn on or off, to convert an input direct current voltage into a specified direct current voltage. However, there is a switching loss in a process of the switching transistor turning on or off. FIG. 1 is a schematic diagram of a voltage and a current existing in processes of a switching transistor turning on and off according to an embodiment of this application. As shown in FIG. 1, in the process of the switching transistor turning on, there is an overlapping area in which a current of the switching transistor increases and a voltage of the switching transistor decreases, resulting in a turn-on loss. The turn-on loss may be understood as a power loss caused when the switching transistor transitions from off to on. Likewise, in the process of the switching transistor turning off, there is also an overlapping area in which the current of the switching transistor decreases and the voltage of the switching transistor increases, resulting in a turn-off loss. The turn-off loss may be understood as a power loss caused when the switching transistor transitions from on to off.

With penetration of energy saving, efficiency of power products continues to improve. Therefore, how to reduce a loss caused by a switching transistor in a DC/DC converter is a key research issue.

SUMMARY

Embodiments of this application provide a controller and control system for a DC/DC converter, to reduce a loss in the DC/DC converter.

According to a first aspect, an embodiment of this application provides a controller for a DC/DC converter. The controller is coupled to the DC/DC converter. The DC/DC converter includes a first switching transistor, a second switching transistor, a first capacitor, and a transformer. The transformer includes an excitation inductor and a transformer leakage inductor. The first switching transistor and the second switching transistor are connected in series and then coupled to two ends of a direct current power supply. A primary side of the transformer is connected in parallel to two ends of the first switching transistor by using the first capacitor, and a secondary side of the transformer is coupled to a direct current load.

The controller controls the first switching transistor to turn on, so that the first capacitor forms a first closed circuit with the excitation inductor and the transformer leakage inductor by using the first switching transistor. A current in the excitation inductor increases in a first direction.

When a preset time period expires, the controller controls the first switching transistor to turn off, so that a voltage at two ends of the second switching transistor decreases.

When the voltage at the two ends of the second switching transistor is a first preset voltage threshold, the controller controls the second switching transistor to turn on, so that the direct current power supply passes through the second switching transistor, the first capacitor, the transformer leakage inductor, and the excitation inductor to form a second closed circuit. In this case, the DC/DC converter enters a first state, the current in the excitation inductor increases in a second direction, and the second direction is opposite to the first direction.

In this embodiment of this application, before the DC/DC converter enters the first state, the first switching transistor is first controlled to turn on to provide a current that is in a negative direction to the second switching transistor, and then the voltage at the two ends of the second switching transistor is reduced to the first preset voltage threshold. When this embodiment of this application is implemented, a turn-on loss in the DC/DC converter can be reduced.

With reference to the first aspect, in a first possible implementation, after the DC/DC converter enters the first state, the controller separately sends at least two pulse waves to the first switching transistor and the second switching transistor according to a preset cycle, so that the DC/DC converter provides a target power to the direct current load.

In this embodiment of this application, the controller separately sends at least two pulse waves to the first switching transistor and the second switching transistor according to the preset cycle, greatly improving energy utilization efficiency of the DC/DC converter on the basis of reducing the turn-on loss.

With reference to the first possible implementation of the first aspect, in a second possible implementation, during the DC/DC converter switches from the first state to a second state, and after the second switching transistor turns off, the controller controls the first switching transistor to turn on. In this case, the first capacitor, the transformer leakage inductor, the excitation inductor, and the first switching transistor form a third closed circuit, and the current in the excitation inductor decreases in the second direction.

When the current in the excitation inductor decreases to a first preset current threshold, the controller controls the first switching transistor to turn off.

In this embodiment of this application, during the DC/DC converter switches from the first state to the second state, and after the second switching transistor turns off, control on the first switching transistor is added, that is, the first switching transistor is controlled to turn on, to transfer energy stored in the transformer leakage inductor to the direct current load, improving energy utilization. In addition, the first switching transistor turns off only when the current in the excitation inductor decreases to the first preset current threshold. This can reduce oscillation that is of a voltage at the two ends of the switching transistor and that occurs when the first switching transistor turns off, and reduce electromagnetic interference in the DC/DC converter.

With reference to the second possible implementation of the first aspect, in a third possible implementation, the second state is a state in which the first switching transistor and the second switching transistor are both in an off state, and a parasitic capacitor of the first switching transistor and a parasitic capacitor of the second switching transistor form a resonant circuit with the first capacitor, the excitation inductor, and the transformer leakage inductor.

With reference to any one of the first aspect or the possible implementations of the first aspect, in a fourth possible implementation, before the controller controls the first switching transistor to turn on, the parasitic capacitor of the first switching transistor and the parasitic capacitor of the second switching transistor form a resonant circuit with the first capacitor, the excitation inductor, and the transformer leakage inductor, and the voltage at the two ends of the first switching transistor is an oscillation voltage.

After receiving a signal indicating that the DC/DC converter enters the first state, the controller obtains the voltage at the two ends of the first switching transistor.

When the oscillation voltage at the two ends of the first switching transistor is a second preset voltage threshold, the controller controls the first switching transistor to turn on.

With reference to the fourth possible implementation of the first aspect, in a fifth possible implementation, the oscillation voltage includes voltages in each cycle, and the second preset voltage threshold is a minimum voltage value of voltages in any cycle.

With reference to the fourth possible implementation of the first aspect, in a sixth possible implementation, the signal indicating that the DC/DC converter enters the first state is determined based on an output voltage of the DC/DC converter.

With reference to any one of the first aspect or the possible implementations of the first aspect, in a seventh possible implementation, the voltage at the two ends of the second switching transistor decreases to the first preset voltage threshold as a first time period elapses.

The current in the excitation inductor decreases from a target current to a second preset current threshold as the first time period elapses, and the target current is a value that is reached by the current in the excitation inductor when the preset time period expires.

With reference to any one of the first aspect or the possible implementations of the first aspect, in an eighth possible implementation, the first preset voltage threshold is zero.

With reference to any one of the first aspect or the possible implementations of the first aspect, in a ninth possible implementation, the first preset current threshold is zero.

According to a second aspect, an embodiment of this application provides a control system for a DC/DC converter. The control system includes a direct current power supply, the DC/DC converter, a direct current load, and the controller according to any one of the first aspect or the possible implementations of the first aspect. An input terminal of the DC/DC converter is coupled to the direct current power supply, an output terminal of the DC/DC converter is coupled to the direct current load, and a control terminal of the DC/DC converter is coupled to the controller.

It should be understood that for the implementations and beneficial effects of the plurality of aspects in this application, refer to each other.

DESCRIPTION OF EMBODIMENTS

The following further describes implementation of technical solutions in this application in detail with reference to the accompanying drawings.

Figure 2:
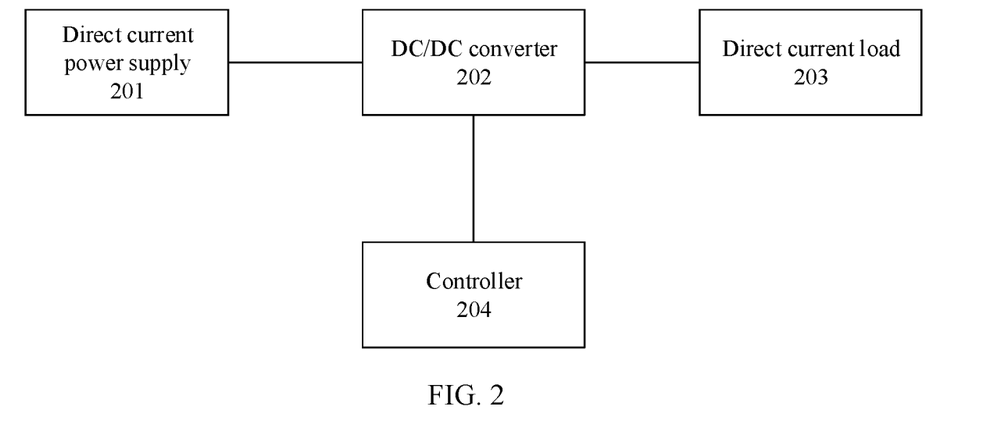
FIG. 2 shows a control system for a DC/DC converter according to an embodiment of this application.

FIG. 2 shows a control system for a DC/DC converter according to an embodiment of this application. As shown in FIG. 2, an input terminal of the DC/DC converter 202 is coupled to a direct current power supply 201, an output terminal of the DC/DC converter 202 is coupled to a direct current load 203, and a control terminal of the DC/DC converter 202 is coupled to a controller 204.

It should be first noted that "coupling" described in this application indicates a direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C.

The direct current power supply 201 may be, for example, an energy storage battery (for example, a Ni—Cd battery, a NiMH battery, a lithium-ion battery, or a lithium polymer battery), a solar cell, an AC/DC converter (Alternating Current/Direct-Current converter), or another DC/DC converter (for example, a BUCK converter, a BOOST converter, or a BUCK-BOOST converter).

The DC/DC converter 202 in this embodiment of this application may include but is not limited to an asymmetric half-bridge flyback converter, an asymmetric half-bridge forward converter, and the like.

The direct current load 203 may be, for example, a mobile phone terminal, an energy storage battery, another DC/DC converter, and/or a DC/AC converter (Direct-Current/Alternating Current converter).

The controller 204 may be, for example, a central processing unit (CPU), another general purpose processor, a digital signal processor (DSP), an application-specific integrated circuit (ASIC), a field programmable gate array (FPGA) or another programmable logic device, a discrete gate or transistor logic device, or a discrete hardware component.

For example, the direct current load 203 is a mobile phone terminal; the direct current power supply 201 is an AC/DC converter that converts an alternating current voltage from a power grid into a direct current voltage; and the controller 204 may control the DC/DC converter 202 to convert the direct current voltage output by the AC/DC converter into a specified direct current voltage value, for example, 5 V or 10 V. For example, the DC/DC converter 202 and the controller 204 may be disposed in a power adapter. The foregoing is an example of a use scenario of the DC/DC converter in this embodiment of this application, and is not exhaustive. It should be understood as that in this embodiment of this application, the controller may control the DC/DC converter to be applied in any scenario requiring that a direct current voltage be converted.

Figure 3:
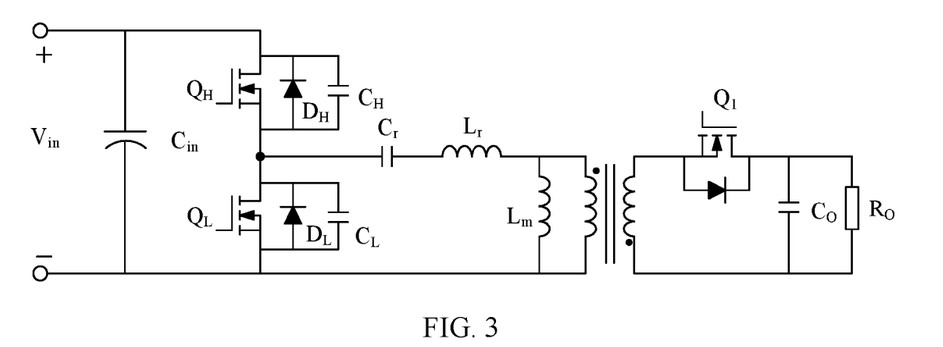
FIG. 3 is a circuit diagram of a DC/DC converter according to an embodiment of this application.

FIG. 3 is a circuit diagram of a DC/DC converter according to an embodiment of this application. As shown in FIG. 3, the DC/DC converter includes a first switching transistor $Q_L$, a second switching transistor $Q_H$, a first capacitor $C_r$, and a transformer. The transformer includes an excitation inductor $L_m$ and a transformer leakage inductor $L_r$. It may be understood that an excitation inductor, a transformer leakage inductor, and an ideal transformer may be specifically implemented as one actual transformer. Further, the DC/DC converter may include a third switching transistor $Q_1$, an output capacitor $C_0$, a load resistor $R_0$, and the like.

In this embodiment of this application, an example is used for description in which the switching transistors are metal-oxide-semiconductor field-effect transistors (MOSFET). It should be understood that the switching transistors may alternatively be other semiconductor devices such as insulated gate bipolar transistors (IGBT).

The first switching transistor $Q_L$ and the second switching transistor $Q_H$ are connected in series and then coupled to two ends of a direct current power supply $V_{in}$. To be specific, a drain of the first switching transistor $Q_L$ is coupled to a source of the second switching transistor $Q_H$, a drain of the second switching transistor $Q_H$ is coupled to a positive electrode of the direct current power supply $V_{in}$ and a source of the first switching transistor $Q_L$ is coupled to a negative electrode of the direct current power supply $V_{in}$. Optionally, a filter capacitor $C_{in}$ is connected in parallel to the two ends of the direct current power supply $V_{in}$. A primary side of the transformer is connected in parallel to two ends of the first switching transistor $Q_L$ by using the first capacitor $C_r$. For example, the drain of the first switching transistor $Q_L$ is coupled to one terminal of the first capacitor $C_r$, the other terminal of the first capacitor $C_r$ is coupled to one side of the primary side of the transformer, and the other side of the primary side of the transformer is coupled to the source of the first switching transistor $Q_L$. A secondary side of the transformer is coupled to a direct current load. For example, one side of the secondary side of the transformer is coupled to a source of the third switching transistor $Q_1$, a drain of the third switching transistor $Q_1$ is coupled to one terminal of the output capacitor $C_0$ and one terminal of the load resistor $R_0$, and the other terminal of the output capacitor $C_0$ and the other terminal of the load resistor $R_0$ are coupled to the other side of the secondary side of the transformer. The output capacitor $C_0$ can reduce ripples of an output voltage of the DC/DC converter. For example, the one side of the primary side of the transformer, for example, an upper side, and the other side of the secondary side of the transformer, for example, a lower side, are dotted terminals, or the other side of the primary side of the transformer, for example, a lower side, and the one side of the secondary side of the transformer, for example, an upper side, are dotted terminals.

It may be understood that in FIG. 3, the load resistor $R_0$ represents the direct current load. The direct current load to which the DC/DC converter is coupled is not limited in this embodiment of this application. The third switching transistor $Q_1$ may be replaced by a diode to implement a rectification function.

The switching transistors in the DC/DC converter, for example, the first switching transistor $Q_L$ and the second switching transistor $Q_H$, are all coupled to a controller (not shown in the figure). The controller may control on and off states of each switching transistor.

Figure 4:
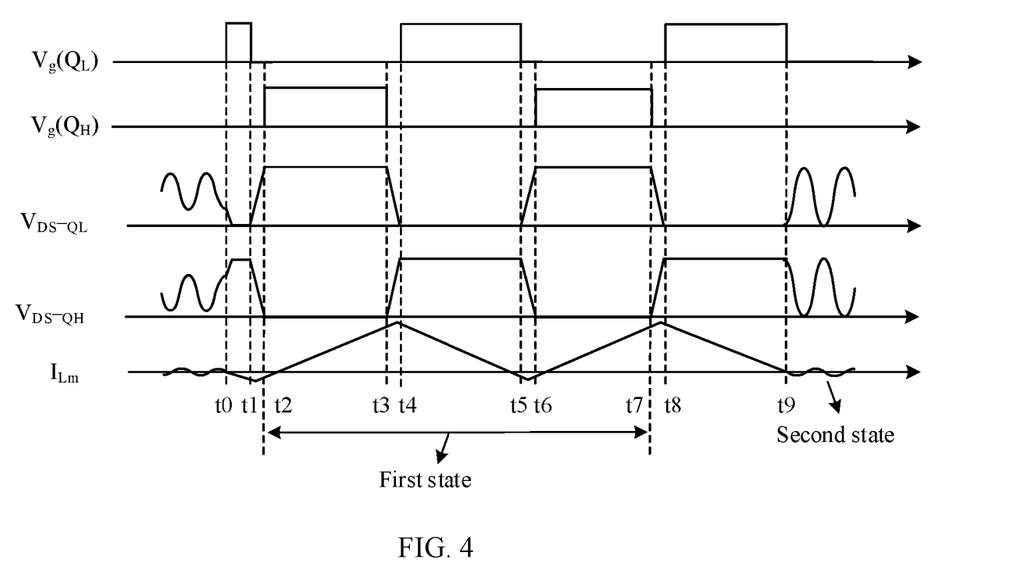
FIG. 4 is a control timing diagram of a DC/DC converter according to an embodiment of this application.

For on/off control timing of the controller for the switching transistors in the DC/DC converter, refer to FIG. 4. FIG. 4 is a control timing diagram of a DC/DC converter according to an embodiment of this application. As shown in FIG. 4, $V_g(Q_L)$ represents a waveform of pulses sent by the controller to the first switching transistor $Q_L$, $V_g(Q_H)$ represents a waveform of pulses sent by the controller to the second switching transistor $Q_H$, $V_{DS-QL}$ represents a waveform of a voltage at the two ends of the first switching transistor $Q_L$, $V_{DS-QH}$ represents a waveform of a voltage at two ends of the second switching transistor $Q_H$, and $I_{Lm}$ represents a waveform of a current in the excitation inductor $L_m$.

Figure 5:
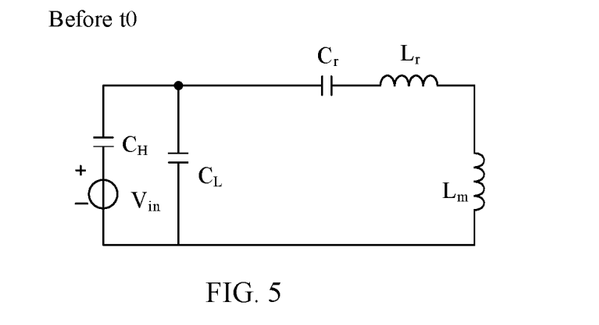
FIG. 5 is a partial equivalent circuit diagram of a DC/DC converter according to an embodiment of this application.

Before a moment $t_0$, the first switching transistor $Q_L$ and the second switching transistor $Q_H$ are both in an off state. For a partial equivalent circuit diagram of the DC/DC converter, refer to FIG. 5. As shown in FIG. 5, a parasitic capacitor $C_L$ of the first switching transistor $Q_L$ and a parasitic capacitor $C_H$ of the second switching transistor $Q_H$ form a resonant circuit with the first capacitor $C_r$, the excitation inductor $L_m$, and the transformer leakage inductor $L_r$. Optionally, after the resonant circuit reaches resonance stability, the voltage at the two ends of the first switching transistor $Q_L$ may be a stable resonance value, for example, a value of a voltage at two ends of the first capacitor $C_r$.

In some feasible implementations, after receiving a signal indicating that the DC/DC converter enters a first state, the controller obtains the voltage at the two ends of the first switching transistor $Q_L$. For example, an output terminal of the DC/DC converter is coupled to a voltage sensor. When the output voltage of the DC/DC converter is lower than a third preset voltage threshold, the voltage sensor generates the signal indicating that the DC/DC converter enters the first state, and sends the signal to the controller. For another example, the direct current load coupled to the secondary side of the transformer may monitor the output voltage of the DC/DC converter in real time. For example, the direct current load is an energy storage battery, and a voltage monitoring function is set in the energy storage battery to monitor the output voltage of the DC/DC converter in real time. When the output voltage of the DC/DC converter decreases to a fourth preset voltage threshold within a preset time range, the direct current load generates the signal indicating that the DC/DC converter enters the first state, and sends the signal to the controller. There are more examples. How the signal indicating that the DC/DC converter enters the first state is generated is not limited in this embodiment of this application. Optionally, the third preset voltage threshold and/or the fourth preset voltage threshold may be determined in advance based on the direct current load.

When the oscillation voltage at the two ends of the first switching transistor $Q_L$ is a second preset voltage threshold, a high level is send to the first switching transistor $Q_L$ (that is, controls the first switching transistor $Q_L$ to turn on).

Figure 6:
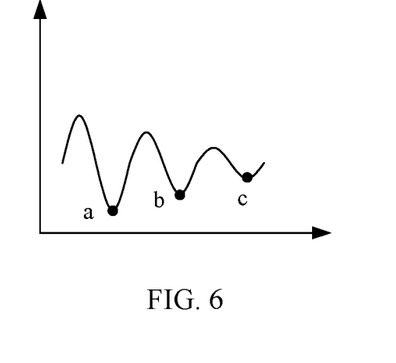
FIG. 6 is a schematic diagram of an oscillation voltage according to an embodiment of this application.

In some feasible implementations, the oscillation voltage includes voltages in each cycle. FIG. 6 is a schematic diagram of an oscillation voltage according to an embodiment of this application. As shown in FIG. 6, of voltages in each cycle, there is a minimum voltage value corresponding to the cycle, for example, voltage values corresponding to points a, b, and c shown in FIG. 6. The second preset voltage threshold may be a minimum voltage value in any cycle. For example, when the controller receives the signal indicating that the DC/DC converter enters the first state, the controller may monitor the voltage at the two ends of the first switching transistor $Q_L$ in real time, to determine that the voltage at the two ends of the first switching transistor $Q_L$ is a minimum value of voltages in the cycle. For another example, when the controller detects that the voltage at the two ends of the first switching transistor $Q_L$ is a target voltage value, and after a target time period elapses, the controller controls the first switching transistor $Q_L$ to turn on, because the voltage at the two ends of the first switching transistor $Q_L$ decreases to a minimum voltage value in the current cycle in this case. The target time period is related to the resonant circuit. When the voltage at the two ends of the first switching transistor $Q_L$ is a minimum voltage value in any cycle, the controller controls the first switching transistor $Q_L$ to turn on. In this case, a turn-on loss of the first switching transistor $Q_L$ is relatively small.

Figure 7A:
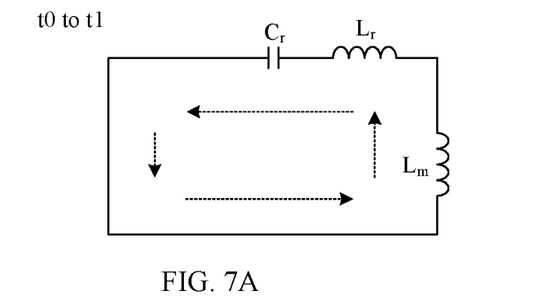
FIG. 7A to FIG. 7C are other partial equivalent circuit diagrams of a DC/DC converter according to an embodiment of this application.

After the controller controls, at the moment $t_0$, the first switching transistor $Q_L$ to turn on, the first capacitor $C_r$ forms, from the moment $t_0$ to a moment $t_1$, a first closed circuit with the excitation inductor $L_m$ and the transformer leakage inductor $L_r$ by using the first switching transistor $Q_L$. For a partial equivalent circuit diagram of the DC/DC converter, refer to FIG. 7A. As shown in FIG. 7A, the current in the excitation inductor $L_m$ increases in a first direction, that is, the current in the excitation inductor $L_m$ increases in a counterclockwise direction. In this embodiment of this application, a clockwise direction is used as a positive direction. With reference to the waveform $L_m$ of the current in the excitation inductor $L_m$ shown in FIG. 4, it can be learned that the current in the excitation inductor $L_m$ increases in a negative direction. In some feasible implementations, the current in the excitation inductor $L_m$ increasing in the counterclockwise direction may result from a reflected voltage of the secondary side (not shown in the figure) of the transformer being applied on two ends of the excitation inductor $L_m$.

It may be understood that due to a system detection error and/or a system control error, a time at which the first switching transistor $Q_L$ turns on is not accurate enough, and the current in the excitation inductor $L_m$ may oscillate in the positive direction at $t_0$. As a result, a direction of the current in the excitation inductor $L_m$ changes from the moment $t_0$ to the moment $t_1$, that is, decreases to zero in the positive direction and then increases in the negative direction.

In some feasible implementations, the time period from $t_0$ to $t_1$ (that is, a preset time period) may be a pre-calculated fixed value, for example, may be calculated based on the first capacitor $C_r$, the parasitic capacitor $C_L$ of the first switching transistor $Q_L$, the parasitic capacitor $C_H$ of the second switching transistor $Q_H$, the excitation inductor $L_m$, the transformer leakage inductor $L_r$, and the like.

Figure 7B:
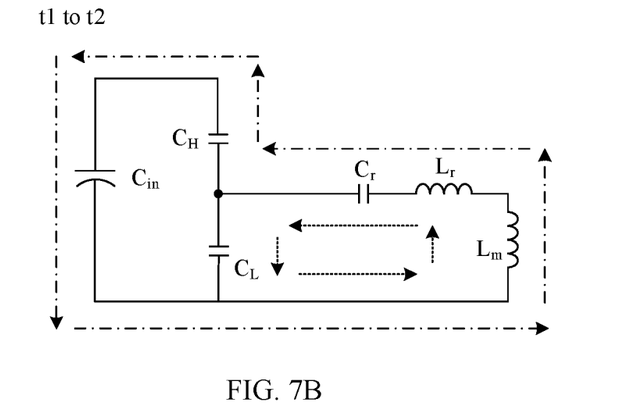

At the moment $t_1$, the controller controls the first switching transistor $Q_L$ to turn off. A current in an inductor cannot change abruptly. For a partial equivalent circuit diagram of the DC/DC converter in a case in which the first switching transistor $Q_L$ turns off, refer to FIG. 7B. As shown in FIG. 7B, the transformer leakage inductor $L_r$ and the excitation inductor $L_m$ charge the parasitic capacitor $C_L$ of the first switching transistor $Q_L$, and discharge to the parasitic capacitor $C_H$ of the second switching transistor $Q_H$.

From the moment $t_1$ to a moment $t_2$, the V voltage $V_{DS-QL}$ at the two ends of the first switching transistor $Q_L$ increases, and the V voltage $V_{DS-QH}$ at the two ends of the second switching transistor $Q_H$ decreases. In some feasible implementations, within the time period from $t_0$ to $t_1$ (that is, the preset time period), the current in the excitation inductor $L_m$ may increase to a target current in the first direction (that is, the counterclockwise direction), and within a time period from $t_1$ to $t_2$, the current in the excitation inductor $L_m$ may decrease from the target current to a second preset current threshold in the clockwise direction as a first time period elapses. In this case, the V voltage $V_{DS-QH}$ at the two ends of the second switching transistor $Q_H$ decreases to a first preset voltage threshold as the same time period (that is, the first time period) elapses. The first time period is not greater than the time period from $t_1$ to $t_2$. For example, the DC/DC converter in this embodiment of this application periodically switches from a second state to the first state. A reference time period may be preset as a preset time period of a current cycle. Within the preset time period, if the V voltage $V_{DS-QH}$ at the two ends of the second switching transistor $Q_H$ has decreased to the first preset voltage threshold when the current in the excitation inductor $L_m$ decreases to the second preset current threshold in the clockwise direction, a preset time period of a next cycle is adjusted to a smaller value based on the preset time period of the current cycle; or if the V voltage $V_{DS-QH}$ at the two ends of the second switching transistor $Q_H$ does not decrease to the first preset voltage threshold when the current in the excitation inductor $L_m$ decreases to the second preset current threshold in the clockwise direction, a preset time period of a next cycle is adjusted to a larger value based on the preset time period of the current cycle. In other words, a time period within which the V voltage $V_{DS-QH}$ at the two ends of the second switching transistor $Q_H$ decreases to the first preset voltage threshold is equal to or close to a time period within which the current in the excitation inductor $L_m$ decreases to the second preset current threshold in the clockwise direction. For example, the first preset voltage threshold is zero, and the second preset current threshold is zero. It may be understood as that a parasitic diode $D_H$ of the second switching transistor $Q_H$ is conducted just when all energy in the excitation inductor $L_m$ is discharged, improving energy utilization efficiency.

At the moment $t_2$, the controller sends a high-level signal to the second switching transistor $Q_H$ (that is, controls the second switching transistor $Q_H$ to turn on). In this case, the V voltage $V_{DS-QH}$ at the two ends of the second switching transistor $Q_H$ is the first preset voltage threshold.

Figure 7C:
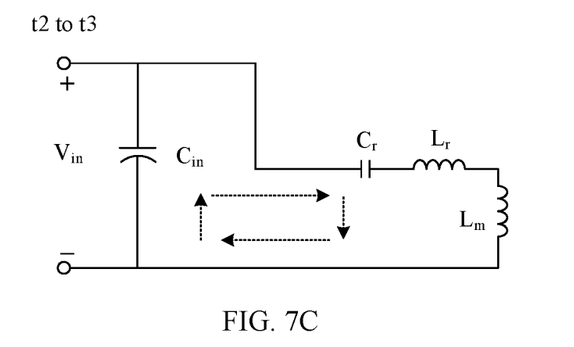

From the moment $t_2$ to a moment $t_3$, the second switching transistor $Q_H$ is in an on state. For a partial equivalent circuit diagram of the DC/DC converter, refer to FIG. 7C. As shown in FIG. 7C, the direct current power supply $V_{in}$ passes through the second switching transistor $Q_H$, the first capacitor $C_r$, the transformer leakage inductor $L_r$, and the excitation inductor $L_m$ to form a second closed circuit. In this case, the DC/DC converter enters the first state, the current in the excitation inductor $L_m$ increases in a second direction, and the second direction is opposite to the first direction. In other words, the second direction is the clockwise direction (that is, the positive direction).

In this embodiment of this application, before the DC/DC converter enters the first state, the first switching transistor is first controlled to turn on to provide a current that is in the negative direction to the second switching transistor, and then the voltage at the two ends of the second switching transistor is reduced to the first preset voltage threshold. When this embodiment of this application is implemented, a turn-on loss in the DC/DC converter can be reduced.

For example, an example is used in which the first preset voltage threshold is zero, as shown in FIG. 4. From the moment $t_1$ to the moment $t_2$, the V voltage $V_{DS-QH}$ at the two ends of the second switching transistor $Q_H$ decreases to zero, and correspondingly, the voltage $V_{DS-QL}$ at the two ends of the first switching transistor $Q_L$ increases to a voltage value of the direct current power supply $V_{in}$. The parasitic capacitor $C_H$ of the second switching transistor $Q_H$ starts discharging and ends discharging during the moment $t_1$ and the moment $t_2$. The parasitic diode $D_H$ of the second switching transistor $Q_H$ is conducted after the parasitic capacitor $C_H$ ends discharging (that is, at the moment $t_2$), so that the V voltage $V_{DS\text{-}QH}$ at the two ends of the second switching transistor $Q_H$ decreases to zero. In this embodiment of this application, when the V voltage $V_{DS\text{-}QH}$ at the two ends of the second switching transistor $Q_H$ decreases to zero, the controller controls the second switching transistor $Q_H$ to turn on. In this case, the second switching transistor $Q_H$ implements zero-voltage turn-on, reducing the turn-on loss in the DC/DC converter.

Further, after the DC/DC converter enters the first state, the controller separately sends at least two pulse waves to the first switching transistor $Q_L$ and the second switching transistor $Q_H$ according to a preset cycle. In specific implementation, with reference to the moment $t_2$ to a moment $t_8$ shown in FIG. 4, an example may be used in which after the DC/DC converter enters the first state at the moment $t_2$, the controller separately sends two pulse waves to the first switching transistor $Q_L$ and the second switching transistor $Q_H$ according to the preset cycle. From the moment $t_2$ to a moment $t_7$, the controller alternately controls the first switching transistor $Q_L$ and the second switching transistor $Q_H$ to turn on to provide a target power to the direct current load. For example, the controller controls the second switching transistor $Q_H$ to be on from the moment $t_2$ to the moment $t_3$, controls the first switching transistor $Q_L$ to be on from the moment $t_4$ to the moment $t_5$, and controls the second switching transistor $Q_H$ to be on from the moment $t_6$ to the moment $t_7$. Time from $t_3$ to $t_4$ and time from $t_5$ to $t_6$ are both dead time.

In this embodiment of this application, the controller separately sends at least two pulse waves to the first switching transistor and the second switching transistor according to the preset cycle, greatly improving energy utilization efficiency of the DC/DC converter on the basis of reducing the turn-on loss.

Figure 8:
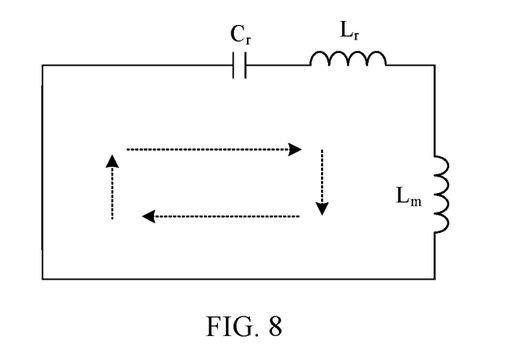
FIG. 8 is another partial equivalent circuit diagram of a DC/DC converter according to an embodiment of this application.

Still further, during the DC/DC converter switches from the first state to the second state, and after the second switching transistor $Q_H$ turns off, the controller controls the first switching transistor $Q_L$ to turn on. In this case, the first capacitor $C_r$, the transformer leakage inductor $L_r$, the excitation inductor $L_m$, and the first switching transistor $Q_L$ form a third closed circuit. For a partial equivalent circuit diagram of the DC/DC converter, refer to FIG. 8. Energy in the excitation inductor $L_m$ is transferred to the first capacitor $C_r$, so that the current in the excitation inductor $L_m$ decreases in the second direction, that is, the current in the excitation inductor $L_m$ decreases in the clockwise direction. In some feasible implementations, the current in the excitation inductor $L_m$ decreasing in the clockwise direction may result from the reflected voltage of the secondary side (not shown in the figure) of the transformer being applied on the two ends of the excitation inductor $L_m$. Specific implementation is described with reference to FIG. 4. In FIG. 4, an example is used in which the DC/DC converter receives three pulse waves in the first state. After sending the three pulse waves and controlling the second switching transistor $Q_H$ to turn off, the controller controls the first switching transistor $Q_L$ to turn on. It may be understood that the DC/DC converter is in the first state from the moment $t_2$ to the moment $t_7$, and is in the second state after a moment $t_9$. A time period within which the DC/DC converter switches from the first state to the second state may be understood as a time period from the moment $t_7$ to the moment $t_9$. After the second switching transistor $Q_H$ turns off and a period of dead time (that is, from $t_7$ to $t_8$) elapses, the controller controls, at the moment $t_8$, the first switching transistor $Q_L$ to turn on. In this case, the current in the excitation inductor $L_m$ decreases in the clockwise direction.

In some feasible implementations, that the DC/DC converter switches from the first state to the second state may be preset in the controller, that is, a quantity of pulse waves sent by the controller to the DC/DC converter may be preset. Optionally, that the DC/DC converter switches from the first state to the second state may be alternatively determined based on a status of the direct current load, for example, a current, a voltage, and/or a power of the direct current load.

When the current in the excitation inductor $L_m$ is a first preset current threshold, the first switching transistor $Q_L$ is controlled to turn off, so that the DC/DC converter enters the second state.

In this embodiment of this application, during the DC/DC converter switches from the first state to the second state, and after the second switching transistor turns off, control on the first switching transistor is added, that is, the first switching transistor is controlled to turn on, to transfer energy stored in the transformer leakage inductor to the direct current load, improving energy utilization. In addition, the first switching transistor turns off only when the current in the excitation inductor $L_m$ is the first preset current threshold. This can reduce oscillation that is of the voltage at the two ends of the switching transistor and that occurs when the first switching transistor turns off, and reduce electromagnetic interference in the DC/DC converter.

Optionally, in some feasible implementations, an example is used in which the first preset current threshold is zero, as shown in FIG. 4. When the current in the excitation inductor $L_m$ decreases to zero, the controller controls the first switching transistor $Q_L$ to turn off. In this case, the first switching transistor $Q_L$ can implement zero-current turn-off. For example, the controller may obtain the current in the excitation inductor $L_m$ in real time, to determine that the current in the excitation inductor $L_m$ decreases to zero. For another example, the controller may alternatively calculate, based on a resonance status and a circuit parameter of the DC/DC converter, a target time at which the current in the excitation inductor $L_m$ decreases to zero. In this embodiment of this application, how to determine that the current in the excitation inductor $L_m$ decreases to the first preset current threshold is not limited.

Figure 9:
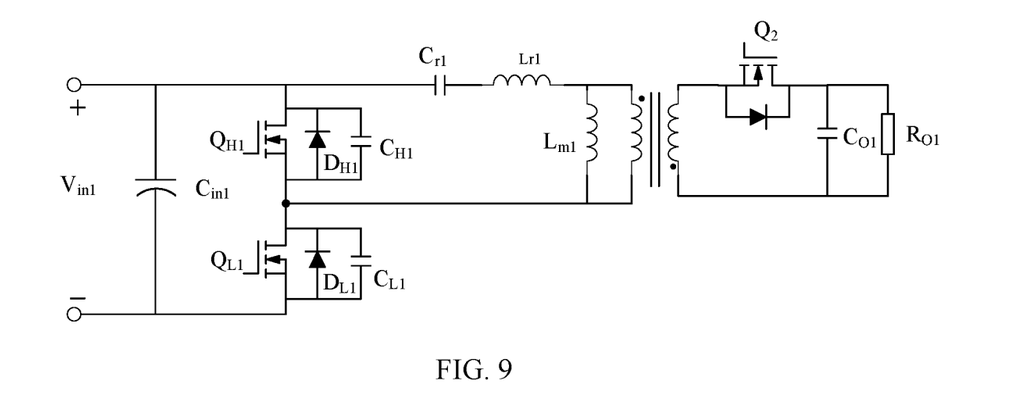
FIG. 9 is another circuit diagram of a DC/DC converter according to an embodiment of this application.

FIG. 9 is another circuit diagram of a DC/DC converter according to an embodiment of this application. As shown in FIG. 9, the DC/DC converter includes a first switching transistor $Q_{H1}$, a second switching transistor $Q_{L1}$, a first capacitor $C_{r1}$, and a transformer. The transformer includes an excitation inductor $L_{mi}$ and a transformer leakage inductor $L_{r1}$. Further, the DC/DC converter may include a third switching transistor $Q_2$, an output capacitor $C_{o1}$, a load resistor $R_{o1}$, and the like.

A difference between the DC/DC converter and the DC/DC converter shown in FIG. 3 in the foregoing description lies in that positions of the first switching transistor and the second switching transistor are interchanged.

A source of the first switching transistor $Q_{H1}$ is coupled to a drain of the second switching transistor $Q_{L1}$, a drain of the first switching transistor $Q_{H1}$ is coupled to a positive electrode of a direct current power supply $V_{in}$ and a source of the second switching transistor $Q_{L1}$ is coupled to a negative electrode of the direct current power supply $V_{in1}$. Optionally, a filter capacitor $C_{in1}$ is connected in parallel to two ends of the direct current power supply $V_{in1}$. A primary side of the transformer is connected in parallel to two ends of the first switching transistor $Q_{H1}$ by using the first capacitor $C_{r1}$. For example, the drain of the first switching transistor $Q_{H1}$ is coupled to one terminal of the first capacitor $C_{r1}$, the other terminal of the first capacitor $C_{r1}$ is coupled to one side of the primary side of the transformer, and the other side of the primary side of the transformer is coupled to the source of the first switching transistor $Q_{H1}$. A secondary side of the transformer is coupled to a direct current load. For example, one side of the secondary side of the transformer is coupled to a source of the third switching transistor $Q_2$, a drain of the third switching transistor $Q_2$ is coupled to one terminal of the output capacitor $C_{O1}$ and one terminal of the load resistor $R_{O1}$, and the other terminal of the output capacitor $C_{O1}$ and the other terminal of the load resistor $R_{O1}$ are coupled to the other side of the secondary side of the transformer. The output capacitor $C_{O1}$ can reduce ripples of an output voltage of the DC/DC converter. For example, the one side of the primary side of the transformer, for example, an upper side, and the other side of the secondary side of the transformer, for example, a lower side, are dotted terminals, or the other side of the primary side of the transformer, for example, a lower side, and the one side of the secondary side of the transformer, for example, an upper side, are dotted terminals.

In specific implementation, the DC/DC converter shown in FIG. 9 may alternatively use the control timing diagram shown in FIG. 4, except that $V_g(Q_L)$ is changed to represent a waveform of pulses sent by a controller to the first switching transistor $Q_{H1}$, and $V_g(Q_H)$ is changed to represent a waveform of pulses sent by the controller to the second switching transistor $Q_{L1}$. For equivalent circuits of the DC/DC converter at different moments, refer to the embodiments described above with reference to FIG. 5 to FIG. 8. Details are not described herein again.

It may be understood that the DC/DC converter shown in FIG. 9 can implement any of the possible implementations described above with reference to FIG. 3 to FIG. 8, and can also achieve the foregoing beneficial effects.

It should be noted that the terms "first" and "second" are merely used for descriptive purposes, and should not be understood as indicating or implying relative importance.

Functional units in the embodiments of the present disclosure may be all integrated into one processing unit, or each unit may be separately used as one unit, or two or more units may be integrated into one unit. The integrated unit may be implemented in a form of hardware, or may be implemented in a form of a combination of hardware and a software functional unit.

If the integrated unit in the present disclosure is implemented in a form of a software functional module and sold or used as an independent product, the integrated unit may also be stored in a computer readable storage medium. Based on such understanding, the technical solutions in the present disclosure can be essentially or the part that contributes to the conventional technology can be embodied in the form of a software product. This computer software product is stored in a storage medium, and includes several instructions for instructing a computer device (which can be a personal computer, a server, or a network device) to perform all or some of the steps of the method described in the embodiments of the present disclosure. The foregoing storage medium includes various media that can store program code, such as a removable storage device, a ROM, a RAM, a magnetic disk, or a compact disc.

The foregoing description is merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A DC/DC converter system, comprising:
   a DC/DC converter, comprising:
      a first switching transistor and a second switching transistor, the first switching transistor and the second switching transistor are connected in series by an intermediate node and are coupled across a direct current (DC) power supply;
      a first capacitor coupled to the intermediate node;
      a transformer coupled to the first capacitor, the transformer comprising an excitation inductor and a transformer leakage inductor, a primary side of the transformer is connected in parallel to two ends of the first switching transistor using the first capacitor, and a secondary side of the transformer is coupled to a DC load;
      a third transistor coupled between a secondary output line of the transformer and the DC load; and
   a controller coupled to the DC/DC converter, the controller comprising:
      a memory storing instructions; and
      at least one processor in communication with the memory, the at least one processor configured, upon execution of the instructions, to perform the following steps:
         control the first switching transistor to turn on so the first capacitor forms a first closed circuit with the excitation inductor and the transformer leakage inductor using the first switching transistor, wherein a first current in the excitation inductor increases in a first direction;
         when a preset time period expires, control the first switching transistor to turn off so a second switching transistor voltage across the second switching transistor decreases; and
         when the second switching transistor voltage across the second switching transistor is a first preset voltage threshold, control the second switching transistor to turn on so a second current passes through the second switching transistor, the first capacitor, the transformer leakage inductor, and the excitation inductor to form a second closed circuit, wherein the DC/DC converter enters a first state, the second current in the excitation inductor increases in a second direction, and the second direction is opposite to the first direction.

2. The controller according to claim 1, wherein the controller is further configured to: after the DC/DC converter enters the first state, separately send at least two pulse waves to the first switching transistor and the second switching transistor according to a preset cycle, so that the DC/DC converter provides a target power to the direct current load.

3. The controller according to claim 2, wherein the controller is further configured to: when the DC/DC converter switches from the first state to a second state, and after the second switching transistor turns off, control the first switching transistor to turn on, wherein, the first capacitor, the transformer leakage inductor, the excitation inductor, and the first switching transistor form a third closed circuit, and the second current in the excitation inductor decreases in the second direction; and the controller is further configured to: when the second current in the excitation inductor decreases to a first preset current threshold, control the first switching transistor to turn off.

4. The controller according to claim 3, wherein in the second state, the first switching transistor and the second switching transistor are both in an off state, and a first transistor parasitic capacitor of the first switching transistor and a second transistor parasitic capacitor of the second switching transistor form a resonant circuit with the first capacitor, the excitation inductor, and the transformer leakage inductor.

5. The controller according to claim 3, wherein the first preset current threshold is zero.

6. The controller according to claim 1, wherein before the controller controls the first switching transistor to turn on, the parasitic capacitor of the first switching transistor and the parasitic capacitor of the second switching transistor form a resonant circuit with the first capacitor, the excitation inductor, and the transformer leakage inductor, and a voltage at the two ends of the first switching transistor is an oscillation voltage;

the controller is further configured to: after receiving a signal indicating that the DC/DC converter enters the first state, obtain the voltage at the two ends of the first switching transistor; and the controller is further configured to: when the oscillation voltage at the two ends of the first switching transistor is a second preset voltage threshold, control the first switching transistor to turn on.

7. The controller according to claim 6, wherein the oscillation voltage comprises voltages in each cycle, and the second preset voltage threshold is a minimum voltage value of voltages in any cycle.

8. The controller according to claim 6, wherein the signal indicating that the DC/DC converter enters the first state is determined based on an output voltage of the DC/DC converter.

9. The controller according to claim 1, wherein the voltage at the two ends of the second switching transistor decreases to the first preset voltage threshold as a first time period elapses; and The first current in the excitation inductor decreases from a target current value to a second preset current threshold as the first time period elapses, and the target current value is reached by the first current in the excitation inductor when the preset time period expires.

10. The controller according to claim 1, wherein the first preset voltage threshold is zero.

11. A control system for a DC/DC converter, the control system comprising:

a direct current (DC) power supply;
a DC load;
the DC/DC converter, input terminals of the DC/DC converter being coupled to the DC power supply and output terminals of the DC/DC converter being coupled to the DC load;
a controller coupled to the DC/DC converter,
the DC/DC converter comprising:
a first switching transistor and a second switching transistor, the first switching transistor and the second switching transistor are connected in series by an intermediate node and are coupled across the DC power supply;

a first capacitor coupled to the intermediate node;
a transformer coupled to the first capacitor, the transformer comprising an excitation inductor and a transformer leakage inductor, a primary side of the transformer is connected in parallel to two ends of the first switching transistor using the first capacitor, and a secondary side of the transformer is coupled to a DC load;
a third transistor coupled between a secondary output line of the transformer and the DC load; and
the controller comprising:
a memory storing instructions; and
at least one processor in communication with the memory, the at least one processor configured, upon execution of the instructions, to perform the following steps:
control the first switching transistor to turn on so the first capacitor forms a first closed circuit with the excitation inductor and the transformer leakage inductor using the first switching transistor, wherein a first current in the excitation inductor increases in a first direction;
when a preset time period expires, control the first switching transistor to turn off so a second switching transistor voltage across the second switching transistor decreases; and
when the second switching transistor voltage across the second switching transistor is a first preset voltage threshold, control the second switching transistor to turn on so a second current passes through the second switching transistor, the first capacitor, the transformer leakage inductor, and the excitation inductor to form a second closed circuit, wherein the DC/DC converter enters a first state, the second current in the excitation inductor increases in a second direction, and the second direction is opposite to the first direction.

12. The control system according to claim 11, wherein the controller is further configured to: after the DC/DC converter enters the first state, separately send at least two pulse waves to the first switching transistor and the second switching transistor according to a preset cycle, so that the DC/DC converter provides a target power to the direct current load.

13. The control system according to claim 12, wherein the controller is further configured to: when the DC/DC converter switches from the first state to a second state, and after the second switching transistor turns off, control the first switching transistor to turn on, wherein, the first capacitor, the transformer leakage inductor, the excitation inductor, and the first switching transistor form a third closed circuit, and the second current in the excitation inductor decreases in the second direction; and The controller is further configured to: when the second current in the excitation inductor decreases to a first preset current threshold, control the first switching transistor to turn off.

14. The control system according to claim 13, wherein in the second state, the first switching transistor and the second switching transistor are both in an off state, and a first transistor parasitic capacitor of the first switching transistor and a second transistor parasitic capacitor of the second switching transistor form a resonant circuit with the first capacitor, the excitation inductor, and the transformer leakage inductor.

15. The control system according to claim 13, wherein the first preset current threshold is zero.

16. The control system according to claim 11, wherein before the controller controls the first switching transistor to turn on, the parasitic capacitor of the first switching transistor and the parasitic capacitor of the second switching transistor form a resonant circuit with the first capacitor, the excitation inductor, and the transformer leakage inductor, and a voltage at the two ends of the first switching transistor is an oscillation voltage;

the controller is further configured to: after receiving a signal indicating that the DC/DC converter enters the first state, obtain the voltage at the two ends of the first switching transistor; and the controller is further configured to: when the oscillation voltage at the two ends of the first switching transistor is a second preset voltage threshold, control the first switching transistor to turn on.

17. The control system according to claim 16, wherein the oscillation voltage comprises voltages in each cycle, and the second preset voltage threshold is a minimum voltage value of voltages in any cycle.

18. The control system according to claim 16, wherein the signal indicating that the DC/DC converter enters the first state is determined based on an output voltage of the DC/DC converter.

19. The control system according to claim 11, wherein the voltage at the two ends of the second switching transistor decreases to the first preset voltage threshold as a first time period elapses; and the first current in the excitation inductor decreases from a target current value to a second preset current threshold as the first time period elapses, and the target current value is reached by the first current in the excitation inductor when the preset time period expires.

20. The control system according to claim 11, wherein the first preset voltage threshold is zero.

\* \* \* \* \*